(No Model.) 3 Sheets—Sheet 1.
T. FORSTNER.
WINDMILL.
No. 515,863. Patented Mar. 6, 1894.
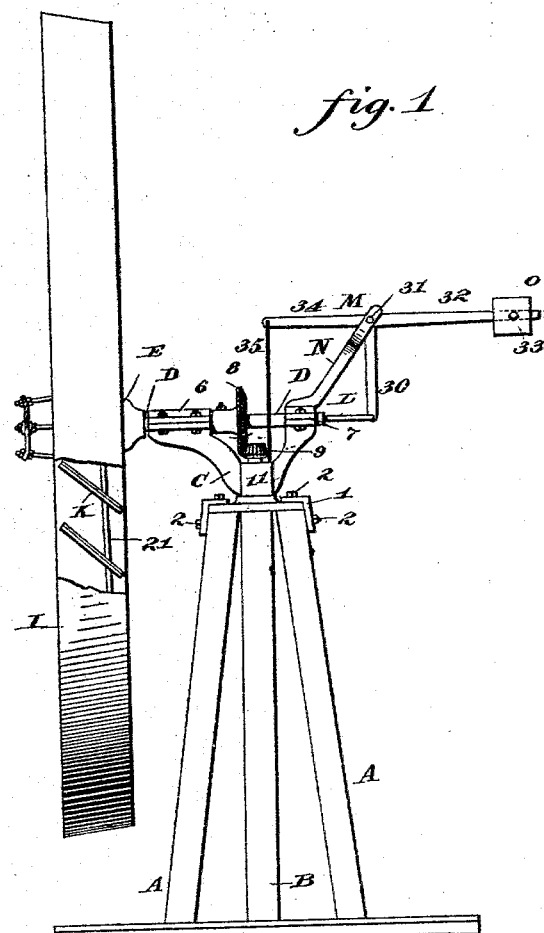
fig. 1
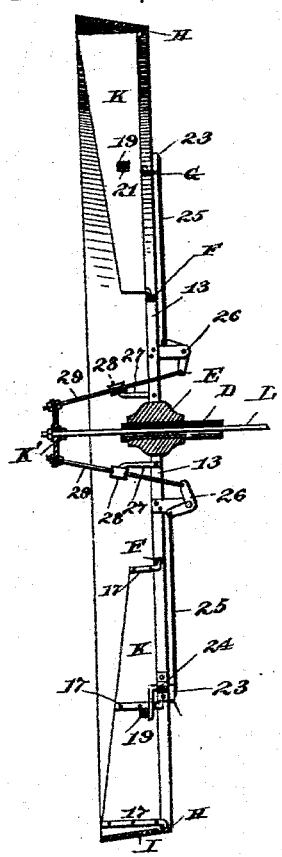
fig. 3
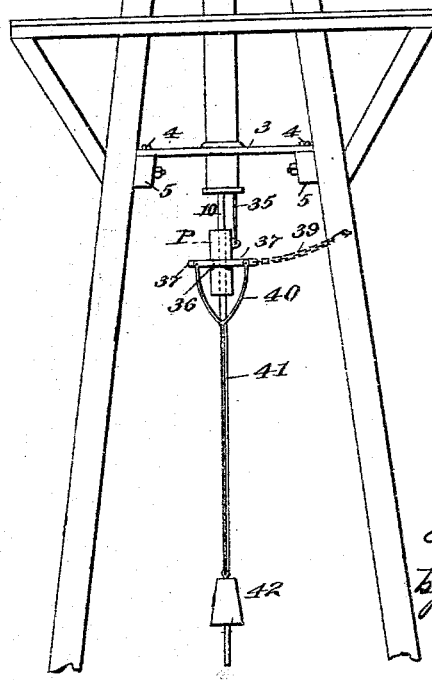
Witnesses:
Inventor:
Thomas Forstner
by _____ Att'y (No Model.) 3 Sheets—Sheet 2.

T. FORSTNER.
WINDMILL.

No. 515,863. Patented Mar. 6, 1894.

Witnesses:

Inventor:
Thomas Forstner
by Max Gergü
Att'y.

(No Model.) 3 Sheets—Sheet 3.
T. FORSTNER.
WINDMILL.
No. 515,863. Patented Mar. 6, 1894.
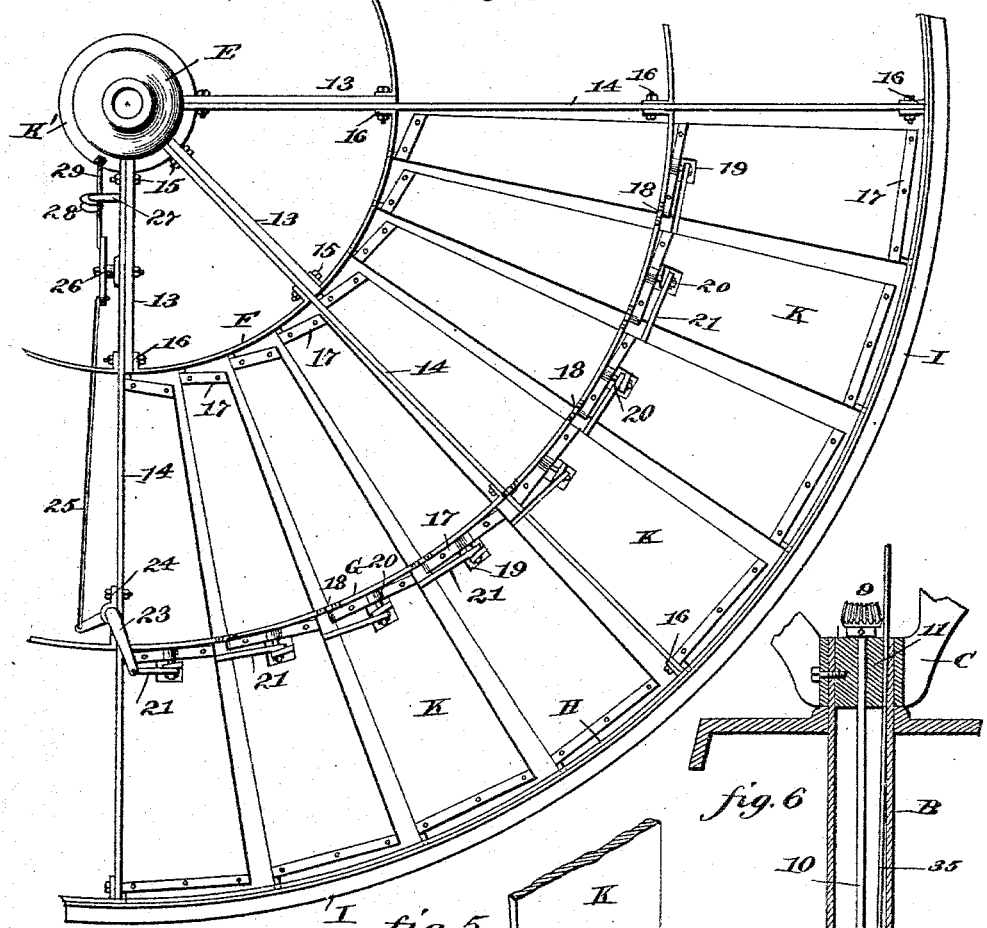
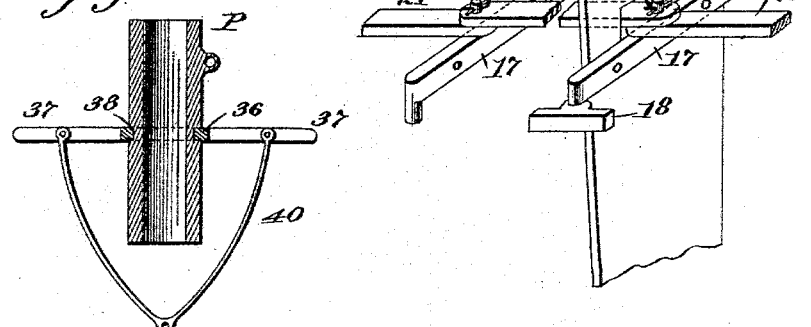
Witnesses:
J. F. Coleman
A. J. Birney
Inventor:
Thomas Forstner
by MacKenzie
Att'y.

UNITED STATES PATENT OFFICE.

THOMAS FORSTNER, OF NEW ULM, MINNESOTA.

WINDMILL.

SPECIFICATION forming part of Letters Patent No. 515,863, dated March 6, 1894.

Application filed March 20, 1893. Serial No. 466,773. (No model.)

*To all whom it may concern:*

Be it known that I, THOMAS FORSTNER, a citizen of the United States, residing at New Ulm, in the county of Brown and State of Minnesota, have invented certain new and useful Improvements in Windmills; and I do hereby declare the following to be a full, clear, and exact description of the invention, such as will enable others skilled in the art to which it appertains to make and use the same.

My invention relates to an improvement in wind mills, and particularly to that class of wind mills which is provided with sectional wheels.

The object of my invention, broadly stated, is to provide means for holding the face of the wheel at right angles to the direction of the wind without the use of the customary tail or vane, thereby avoiding the disadvantages existing in those wind mills provided with such tails or vanes.

Another object of my invention is to provide means for protecting the sails of the wheel from the action of side currents of air, such side currents often causing the wrecking of the wheel in those mills not provided with my improvement.

A further object of my invention is to support the sails at as many points as possible, not only for the purpose of holding the sails to their proper angle, but also for the purpose of allowing the sails to be given an angle varying from the periphery of the wheel to its center.

Another object of my invention is to provide means for automatically regulating the angle of the sails according to the velocity of the wind so that, without the use of tails or side vanes, the wheel will automatically control its own speed or be thrown into a position presenting the minimum resistance to the wind when a heavy wind is blowing.

With these objects in view the invention consists of such details of construction and combination of parts as will first be described in connection with the accompanying drawings, and then pointed out in the claims.

Figure 2:
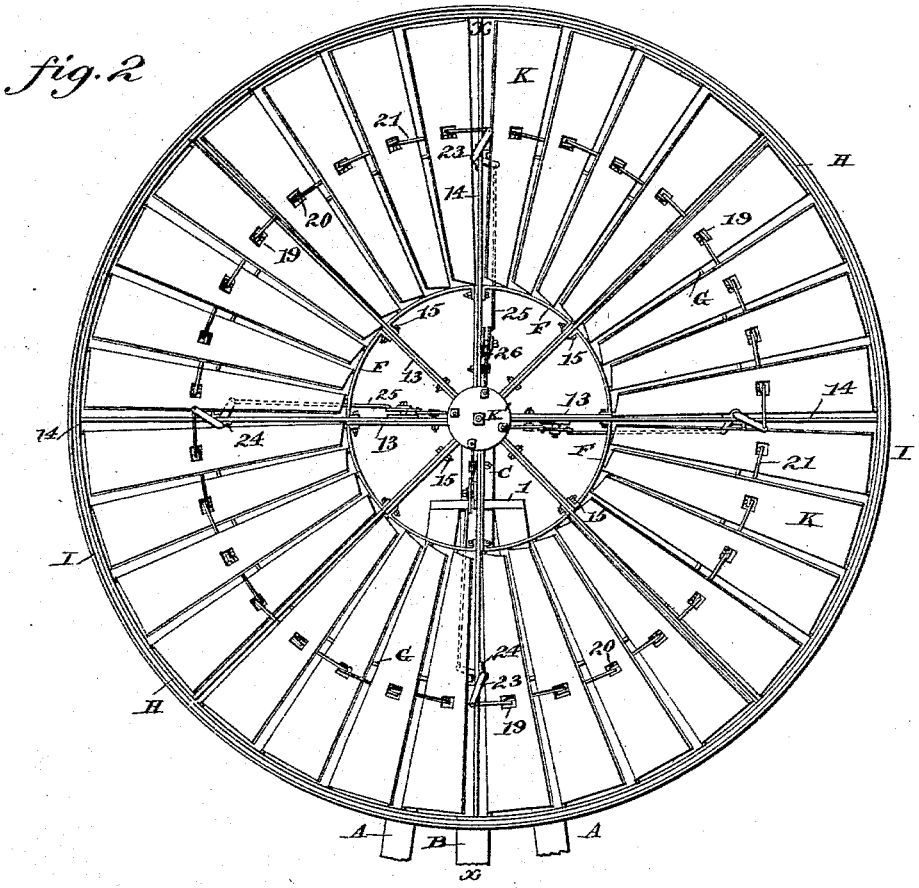
Figure 4:
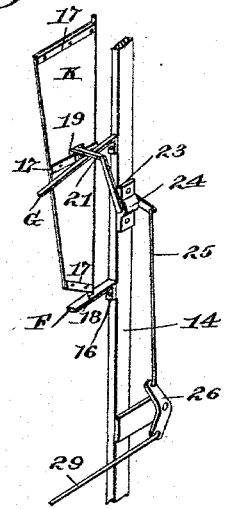

In the drawings—Figure 1 is a side elevation, partly in section, of a wind mill embodying my improvements. Fig. 2 is a front view of the wheel. Fig. 3 is a sectional view taken on the line $x$—$x$, Fig. 2. Fig. 4 is a detail perspective view of one of the vanes, showing the bell-cranks on a section of one of the radial spokes. Fig. 5 is a detail view of the links and pintle-straps. Fig. 6 is a section through the center of the pivot-pipe, bracket-head, and lower-cap. Fig. 7 is a rear view of a portion of the wheel. Fig. 8 is a detail view of the sleeve, collar, and collar-arms.

Referring to the drawings, A are the batter-posts forming the top end of the tower which is constructed as usual, being provided at its upper end with a tower-cap, 1, which is bolted to the batter-posts at 2, as shown, and forms an upper bearing for a vertical pivot-pipe, B, journaled at its lower end in a bearing, 3, bolted at 4 to side braces, 5, secured to the tower.

The pivot-pipe, B, is provided with a bracket-head, C, secured to the pipe above the upper bearing, and rotating thereon, this bracket-head having journals, 6 and 7, in which is mounted the hollow wheel-shaft, D, carrying a wheel-hub, E, at its outer or forward end and a bevel driving-gear, 8, near its center between the two journals, 6 and 7. The gear-wheel, 8, meshes into a bevel pinion, 9, fixed on the upper end of a vertical pinion shaft, 10, which is mounted in a vertical bearing, 11, in the bracket-head and in a vertical bearing, 12, at the lower end of the pipe, B. The wheel-hub, E, carries, preferably, eight radial center spokes, 13, equidistant from each other, to which center spokes are bolted spokes, 14, by means of bolts, 15, passing through both the center and outer spokes, the latter projecting inward and lapping onto the outer spokes for that purpose. Between the outer spokes are located inner segments, F, intermediate segments, G, and outer segments, H, these segments having their ends bent inward and bolted to the outer spokes at 16. The outer segments carry a broad peripheral tire or circular vane, I, whose forward diameter is greater than its rear diameter, that is to say, the tire is a frustum of a cone.

K are vanes or sails, each pivoted or hinged to the segments, F, G, and H, by means of strap-pintles, 17, secured to the rear side of the sails, each pintle working in a pintle-socket, 18, bolted to its respective segment.

While I have shown but one set of intermediate segments, and but one set of intermediate pintle-hinges, it is to be understood that I may use several such sets of intermediate segments, in which case the sails will be provided with an equal number of sets of intermediate pintle-hinges, that is, each sail will be pivotally attached to each intermediate set of segments, so that on wheels of large diameter the sails may be supported at as many intermediate points as desired.

Each vane is provided with a central opening or slot, 19, adjoining one of the intermediate pintles (if more than one be used) and the pintle at such slot has its pin portion, 20, arranged in a radial position.

The pin of one sail is connected to the pin of the next sail by a link, 21, preferably of bar-iron, each link being provided with a hole at each end, through which the pins pass, and each link passing through the opening, 19, in its respective sail. Thus it will be seen that each pin carries two links, these links being held in place on the pin by a suitable cotter or spring-key, 22, as will be fully understood from the drawings. The vanes or sails are not all united by the links, but are connected in quadrantal sections, so that the last sail of each section has but one link pivoted on the pin of its intermediate pintle-strap, the forward end of the forward link of each quandrantal section being connected to the outer arm of a bell-crank, 23, journaled in a boxing, 24, bolted to one of the outer spokes. The inner arms of the bell-cranks are connected to the outer ends of rods, 25, whose inner ends are pivotally connected to bell-cranks, 26, pivoted on the central spokes in a radial line with the bell-cranks, 23, as shown. The four center spokes carrying these bell-cranks, 26, are provided with forward-projecting bracket-arms, 27, carrying rollers, 28, at the forward ends. Against the rollers run rods, 29, which are attached at their rear ends to the bell-cranks, 26, and at their forward ends are connected to a disk, K', revolubly mounted on an adjusting shaft, $l$, which passes through the center of the hollow wheel-shaft, D, in which it is supported, and is connected to a vertical arm, 30, of a triple-arm bell-crank, M, pivotally mounted at 31, on a supporting arm, N, secured to the bracket-head, the bell-crank, M, having a weight arm, 32, on which slides a weight, O, provided with a set screw, 33, by means of which the weight may be fixed to the weight-arm at any distance from the pivotal point, 31. The bell-crank, M, has its third arm, 34, connected by a vertical rod, 35, which passes downward through the pivot-pipe, to a swivel or sleeve, P, through which the pinion-shaft, 10, loosely passes, the sleeve, P, being suspended or supported on the shaft by the vertical rod, 35. The sleeve is surrounded by a collar, 36, having radial arms, 37, the collar fitting loosely in a circumferential groove, 38, in the sleeve, and being held from turning by a chain, 39, attached to one end of one of the radial arms, 37, and to one of the batter-posts, A, of the tower. To the radial arms is fastened a bail, 40, which is connected at its center to a wire cable or rod, 41, provided with a suitable weight, 42. When the wind blows into the front of the wheel it will revolve it as usual, rotating the hollow wheel-shaft, D, and with it the bevel gear-wheel, 8, which in turn drives the bevel-pinion, 9, and thus transmits motion through the vertical pinion-shaft, 10, to the machinery as usual. If at any time the velocity of the wind exerts a pressure on the sails, K, greater than the normal pressure for which they are set, then the sails will be forced to assume a position more in the direction of the wind. As the sails are thus changed in their position, they will pull the adjusting-shaft, L, so as to raise the weight, O, and lower the weight, 42. When the pressure on the sails becomes sufficient to overcome the power of the weight, O, the sails will be forced into a position parallel to the direction of the wind and presenting the edge only to the effect of the wind, this being the condition of the wheel in a heavy storm. As the wind dies down the weight, O, will pull the vanes back into their normal position, raising the weight, 42, at the same time. If at any time it is desired to stop the wheel or reduce its speed, the weight, 42, may be pulled down by hand, or a heavier weight may be substituted for it. If at any time the wind changes its direction, it will act on the coned tire to force the wheel around into the wind, the coned tire at the same time serving to protect the vanes or sails from the side wind which is a frequent cause of wrecking of the sails. As the wheel rotates, it will rotate the disk, K', through the medium of the bracket-arms, 27, and rollers, 28, which bear against rods, 29. The disk being loose on the adjusting-shaft, L, will be free to revolve with the wheel, thus permitting the shaft, L, to remain stationary, and avoiding the necessity of universal joints and other complicated constructions such as are usual in all those forms of wind mills with which I am acquainted.

Having thus fully described my invention, what I claim as new, and desire to secure by Letters Patent, is—

1. In a wind-mill, the combination with a tower and a hollow pivot-post revolubly mounted in the tower, a bracket-head fixed to the pivot-post, a hollow mill-shaft journaled in the bracket-head, a bevel gear-wheel fixed on the mill-shaft, a vertical shaft passing through the pivot-post and journaled thereon, and a bevel pinion fixed on the upper end of the vertical shaft, of a wind-wheel fixed on the front end of the mill-shaft and provided with adjustable sails, an adjusting-shaft passing through the hollow mill-shaft, a disk on the front end of the adjusting-shaft, sail-setting mechanism connected to the disk, a bracket-arm secured to the rear end of the bracket-head, a triple arm bell-crank pivoted on the bracket-arm and having one arm connected to the rear end of the adjusting-shaft, a weight adjustably mounted on the second arm of the bell-crank, a sleeve-rod connected to the third arm of the bell-crank, a sleeve loosely mounted on the vertical shaft and carried by the sleeve-rod, said sleeve being provided with a circumferential groove, a collar movable in the groove and having integral horizontal arms, means for securing one of the collar-arms to the tower, and a weight attached to the horizontal collar-arms, substantially as described and for the purpose set forth.

2. In a sectional wind-wheel, the combination with a central hub, and a series of central spokes radiating from the hub, of a series of outer spokes secured to the center spokes, a series of inner, outer, and intermediate segments secured between the spokes, and a series of sails pivoted to the segments, substantially as described and for the purpose set forth.

3. In a sectional wind-wheel, the combination with a wheel-frame, and a series of sails pivoted on the wheel-frame, each sail being provided with a slot, of a pin fixed to each sail in line with the slot, a series of links connecting the pins of the sails, and a link-operating device for moving the links to adjust the sails, substantially as described and for the purpose set forth.

4. In a sectional wind-wheel, the combination with a hollow mill-shaft, a hub fixed on the front end of the mill-shaft, a series of spokes radiating from the hub, and a series of segments secured between the spokes, of a series of vanes pivotally attached to the segments, a series of links connecting the vanes in sets, an outer bell-crank for each set connected to the first link of its respective set, an inner bell-crank for each set, a series of rods connecting the inner and outer bell-cranks, a bracket-arm for each rod, a roller mounted in each bracket-arm, an adjusting-shaft passing through the mill-shaft, a disk revoluble on the front end of the adjusting-shaft, a series of rods connecting each inner bell-crank to the disk and bearing against the rollers and means for operating the adjusting-shaft, substantially as described and for the purpose set forth.

In testimony whereof I affix my signature in presence of two witnesses.

THOMAS FORSTNER.

Witnesses:
I. M. OLSEN,
C. W. HEIMANN.